US009973706B2

(12) United States Patent
Wang et al.

(10) Patent No.: US 9,973,706 B2
(45) Date of Patent: May 15, 2018

(54) METHOD AND APPARATUS FOR DETECTING IMAGING CONDITIONS

(71) Applicant: Nokia Technologies Oy, Espoo (FI)

(72) Inventors: Kongqiao Wang, Helsinki (FI); Jiangwei Li, Beijing (CN); He Yan, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days. days.

(21) Appl. No.: 15/326,630

(22) PCT Filed: Jul. 3, 2015

(86) PCT No.: PCT/FI2015/050484
§ 371 (c)(1),
(2) Date: Jan. 16, 2017

(87) PCT Pub. No.: WO2016/009110
PCT Pub. Date: Jan. 21, 2016

(65) Prior Publication Data
US 2017/0208234 A1  Jul. 20, 2017

(30) Foreign Application Priority Data

Jul. 17, 2014 (CN) .......................... 2014 1 0357287

(51) Int. Cl.
H04N 5/235  (2006.01)
G06K 9/46  (2006.01)
(Continued)

(52) U.S. Cl.
CPC ......... H04N 5/2352 (2013.01); G06K 9/4661 (2013.01); G06T 7/13 (2017.01);
(Continued)

(58) Field of Classification Search
None
See application file for complete search history.

(56) References Cited

U.S. PATENT DOCUMENTS 7,403,222 B2  7/2008  Bell et al.
7,403,707 B2  7/2008  Raskar et al.
(Continued)

FOREIGN PATENT DOCUMENTS

CN  1835562 A  9/2006
CN  101126661 A  2/2008
(Continued)

OTHER PUBLICATIONS

Office action received for corresponding Chinese Patent Application No. 201410357287.3, dated Jun. 27, 2017, 5 pages of office action and 3 pages of office action translation available.
(Continued)

Primary Examiner — Roberto Velez
Assistant Examiner — Yih-Sien Kao
(74) Attorney, Agent, or Firm — Nokia Technologies Oy

(57) ABSTRACT

Embodiments of the present invention relate to a method and apparatus for detecting an imaging condition. In one embodiment, there is provided a method for detecting an imaging condition. The method comprises: determining, based on luminance distribution in a first image of a scene, imaging lightness of the first image, the first image being captured by a first camera; determining, based on detection of a highlighted region in a second image of the scene, imaging exposureness of the second image, the second image being captured by a second camera, the first image and the second image being captured under a same or similar imaging condition, an exposure amount of the first camera being lower than an exposure amount of the second camera. There is also disclosed a relevant apparatus, electronic device, and a computer program product.

19 Claims, 3 Drawing Sheets

(51) Int. Cl.
H04N 5/225 (2006.01)
G06T 7/49 (2017.01)
G06T 7/13 (2017.01)
H04N 5/232 (2006.01)

(52) U.S. Cl.
CPC ............. *G06T 7/49* (2017.01); *H04N 5/2258* (2013.01); *H04N 5/2351* (2013.01); *H04N 5/23232* (2013.01)

(56) References Cited

U.S. PATENT DOCUMENTS

| | | | |
|---|---|---|---|
| 7,538,801 | B2 | 5/2009 | Hu et al. |
| 8,319,822 | B2 | 11/2012 | McClatchie |
| 2006/0227209 | A1 | 10/2006 | Takayama |
| 2012/0262600 | A1 | 10/2012 | Velarde et al. |
| 2013/0335599 | A1 | 12/2013 | Zhang |

FOREIGN PATENT DOCUMENTS

| | | |
|---|---|---|
| CN | 101211407 A | 7/2008 |
| CN | 101373310 A | 2/2009 |
| CN | 101444084 A | 5/2009 |
| CN | 101426090 B | 11/2010 |
| CN | 102572245 A | 7/2012 |
| CN | 102959941 A | 3/2013 |
| CN | 103259976 A | 8/2013 |
| CN | 103329541 A | 9/2013 |
| CN | 103518223 A | 1/2014 |
| EP | 2590396 A1 | 5/2013 |
| JP | 2005-223605 A | 8/2005 |
| JP | 2008-104010 A | 5/2008 |
| WO | 2012/145415 A1 | 10/2012 |

OTHER PUBLICATIONS

"Solid-state Color Night Vision Fusion of Low-light Visible and Thermal Infrared Imagery", Lincoln Laboratory Journal, vol. 11, No. 1, 1998, pp. 41-60.

Office action received for corresponding Chinese Patent Application No. 201410357287.3, dated Nov. 1, 2016, 8 pages of office action and 3 pages of office action translation available.

International Search Report and Written Opinion received for corresponding Patent Cooperation Treaty Application No. PCT/FI2015/050484, dated Jul. 3, 2015, 15 pages.

Shen, J. et al., "Over-exposure image correction with automatic texture synthesis, 2011 International Congress on Image and Signal Processing", [online], Oct. 2011, [retrieved on Oct. 22, 2015]. Retrieved from the Internet: <URL: http//ieeexplore.ieee.org/stamp/stamp.jsp?tp=&arnumber=6100306><DOI:http://dx.doi.org/10.1109/CISP.2011.6100306>.

Koskiranta, T., "Improving automatic imaging algorithms with dual camera system, Master of Science Thesis, Tampere University of Technology", Jun. 2014 [online], [retrieved on Oct. 7, 2015]. Retrieved from the internet ,<URL: http://dspace.cc.tut.fi/dpub/bitstream/handle/123456789/22332/koskiranta.pdf?sequence=1>.

Jiang T. et al., "Multiple templates auto exposure control based on luminance histogram for onboard camera", 2011 IEEE International Conference on Computer Science and Automation Engineering (CSAE), [online], Jun. 2011, [retrieved on Oct. 6, 2015]. Retrieved from the Internet:<URL:http//ieeexplore.ieee.org/stamp/stamp.jsp?tp=&arnumber=5952672><DOI:http://dx.doi.org/10.1109/CSAE.2011.5952672>.

Extended European Search Report received for corresponding European Patent Application No. 15822052.5, dated Jan. 25, 2018, 7 pages.

Office action received for corresponding Japanese Patent Application No. 2016-566881, dated Feb. 1, 2018, 3 pages of office action and no pages of office action translation available.

METHOD AND APPARATUS FOR DETECTING IMAGING CONDITIONS

RELATED APPLICATION

This application was originally filed as Patent Cooperation Treaty Application No. PCT/FI2015/050484 filed Jul. 3, 2015 which claims priority benefit of Chinese Patent Application No. 201410357287.3, filed Jul. 17, 2014.

FIELD OF THE INVENTION

Embodiments of the present invention relate to the field of image processing; more specifically, relate to a method and apparatus for detecting imaging conditions.

BACKGROUND OF THE INVENTION

In order to capture an image having a higher quality, there has been proposed a dual-camera configuration. In such configuration, user equipment such as a mobile phone may be equipped with two cameras at one side. For example, a camera may be a black-white camera, while the other camera is a color camera. It has been found that under the same lighting condition, the exposure volume of the black-white camera is significantly larger than the color camera. As such, under a low-light condition, the black-white camera can still reach an appropriate exposure volume. By fusing an image captured by the black-white camera with an image captured by a color camera, the quality of a final image will be apparently superior to the image captured by using a single camera.

Although the dual-camera configuration is initially proposed for image capture in a low-light condition, such configuration may likewise be used for other imaging conditions. For different imaging conditions, when fusing the images captured by different cameras, it is needed to perform different processing and/or adopt different processing parameters. For example, under a normal light condition, a super resolution processing may be applied in fusing so as to enhance the resolution of an image. However, under a low-light condition, because there is a relatively large gap between the brightness of the images captured by two cameras, the super resolution processing cannot be performed. In other words, when capturing an image using a dual-camera configuration, a better post-processing can be performed by determining an imaging condition.

In practice, it is impractical to require a user to set an imaging condition in a manual manner. First, it will significantly increase user burden and dampen user experience. Moreover, for non-professional users, they can hardly set an imaging condition. Some traditional solutions detect an imaging condition through reading camera hardware parameters. For example, lighting in an environment may be detected based on scene reflectivity. However, such lighting detection is extremely sensitive to noise, thereby causing a detecting result instable. Moreover, not all cameras are equipped with hardware deeded for lighting detection. Besides, in addition to lighting, the imaging process is also affected by many other factors, such as the characteristics of an imaging sensor, and the like. Therefore, a method of simply reading hardware photosensitive parameters is unreliable for s dual-camera configuration.

SUMMARY OF THE INVENTION

Generally, embodiments of the present invention provide a method and apparatus for detecting an imaging condition.

In one aspect, embodiments of the present invention provide a method for detecting an imaging condition. The method comprises: determining, based on luminance distribution in a first image of a scene, imaging lightness of the first image, the first image being captured by a first camera; determining, based on detection of a highlighted region in a second image of the scene, imaging exposureness of the second image, the second image being captured by a second camera, the first image and the second image being captured under a same or similar imaging condition, an exposure amount of the first camera being lower than an exposure amount of the second camera.

Embodiments in this aspect further comprise a computer program product for implementing the above method.

On the other hand, embodiments of the present invention provide an apparatus for detecting an imaging condition. The apparatus comprises: a lightness determining unit configured to determine, based on luminance distribution in a first image of a scene, imaging lightness of the first image, the first image being captured by a first camera; an exposureness determining unit configured to determine, based on detection of a highlighted region in a second image of the scene, imaging exposureness of the second image, the second image being captured by a second camera, the first image and the second image being captured under a same or similar imaging condition, an exposure amount of the first camera being lower than an exposure amount of the second camera.

Embodiments in this aspect further comprise an electronic device comprising the above apparatus.

It will be understood through the following description that according to embodiments of the present invention, the imaging exposureness may be estimated using a camera with a relatively large exposure amount (for example, a black-white camera), while the imaging lightness may be estimated using another camera (for example, a color camera) with a relatively low exposure amount. In this way, an imaging condition may be automatically and accurately detected. In one embodiment, by enabling and/or disenabling corresponding processing based on an imaging condition, image fusion in a dual-camera mode may be adaptively controlled. In this way, the efficiency and effect of image fusion may be significantly enhanced. Other features and advantages of the present invention will become easily comprehensible through the description below.

BRIEF DESCRIPTION OF THE DRAWINGS

The above and other objectives, features and advantages of embodiments of the present invention will become more comprehensible through reading the following detailed description with reference to the accompanying drawings. In the figures, several embodiments of the present invention are illustrated in an exemplary, rather than limitative, manner, wherein.

Throughout the drawings, same or corresponding reference numerals represent same or corresponding portions.

DETAILED DESCRIPTION

Figure 1:
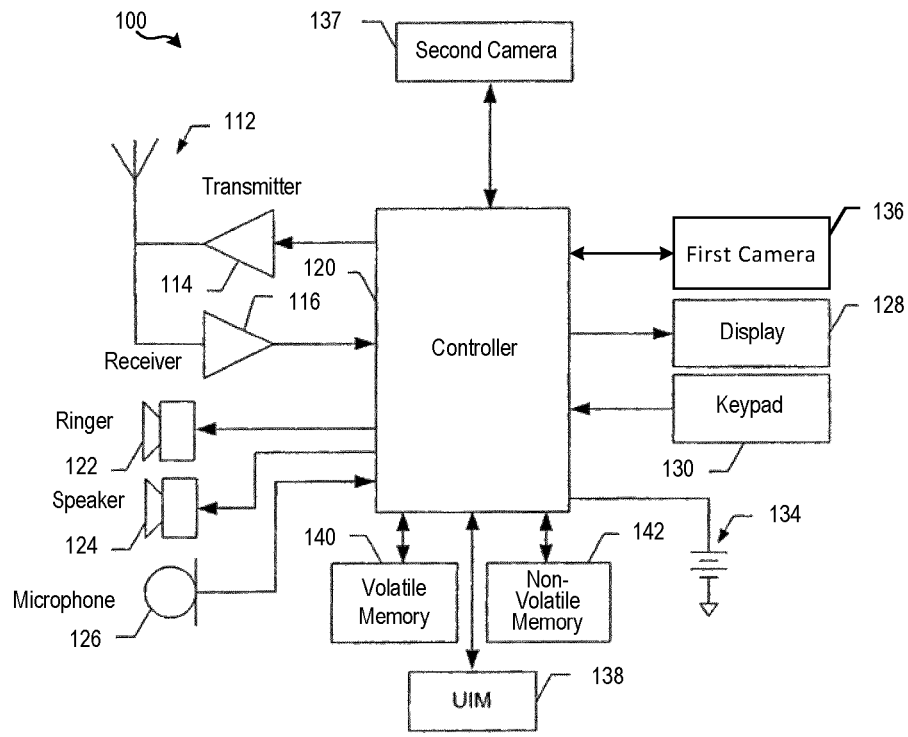
FIG. 1 shows a schematic block diagram of an electronic device in which embodiments of the present invention may be implemented.

Hereinafter, the preferred embodiments of the present disclosure will be described in more detail with reference to the accompanying drawings. Although preferred embodiments of the present disclosure are shown in the drawings, it should be understood that the present disclosure may be implemented in various manners, without being limited by the embodiments described herein. On the contrary, provision of these embodiments is for making the present disclosure more thorough and complete and enabling the scope of the present disclosure to be completely conveyed to those skilled in the art.

Unless otherwise indicated, in the description and claims infra, the term "based on" indicates "at least partially based on." The term "comprise" is an open term, representing "including, but not limited." The term "plural" indicates "two or more." The term "one embodiment" indicates "at least one embodiment"; while the term "another embodiment" indicates "at least one further embodiment."

Additionally, in the description and claims infra, the term "image" not only comprises static images, but also comprises dynamic images (for example, frames of a video). Additionally, the term "capturing an image" not only comprises the process of shooting an image, but also comprises any post-processing process with respect to the shot image. Relevant definitions of other terms will be provided in the description below.

FIG. 1 shows a block diagram of an electronic device 100 in which embodiments of the present invention may be implemented. According to embodiments of the present invention, the electronic device 100 may be a portable electronic device such as a mobile phone. However, it should be understood that it is only exemplary and non-limiting. Other user equipment types may also easily employ embodiments of the present invention, such as a personal digital assistant (PDA), a pager, a mobile computer, a mobile TV, a gaming device, a laptop computer, a camera, a video camera, a GPS device, and other type of voice and text communication system.

The electronic device 100 may have a communication function. To this end, as shown in the figure, the electronic device 100 may comprise one or more antennas 112 operable to communicate with a transmitter 114 and a receiver 116. The electronic device 100 further comprises at least one processor controller 120. It should be understood that the controller 120 comprises circuits needed for implementing all functions of the electronic device 100. For example, the controller 120 may comprise a digital signal processor device, a microprocessor device, an A/D converter, a D/A converter and other support circuit. The control and signal processing functions of the electronic device 100 are distributed dependent on respective capabilities of these devices. The electronic device 100 may further comprise a user interface, for example, may comprise a ringer 122, a microphone 124, a loudspeaker 126, a display or a viewfinder 128 and a keypad 130. All of the above devices are coupled to the controller 120.

The electronic device 100 further comprises a first camera 136 and a second camera 137 for capturing a static image and/or a dynamic image. According to embodiments of the present invention, the first camera 136 and the second camera 137 may have different exposure amounts for the same lighting condition. More specifically, in one embodiment, the exposure amount of the second camera 137 may be significantly larger than the exposure amount of the first camera 136. For example, in one embodiment, the first camera 136 may be a color camera, and the second camera 137 may be a black-white camera. As known, under the same lighting condition, the exposure amount of the black-white camera may amount to 3 or 4 times of the exposure amount of the color camera. Of course, such configuration is not a must. Any currently known or future developed camera may be used to implement the first camera 136 and the second camera 137, as long as the difference between exposure amounts of the two is greater than a predetermined threshold.

According to embodiments of the present invention, the first camera 136 and the second camera 137 may be located at a same side of the electronic device 100. In use, the first camera 136 and the second camera 137 may be configured to simultaneously or almost simultaneously capture images of a same scene. In one embodiment, the optical axes of the first camera 136 and the second camera 137 may be parallel to each other. In this way, a transformation such as an image offset may be used to fuse the images captured by the two cameras, which is already known. Of course, any other positional relationships between the two cameras are all possible, as long as the images of the same scene as captured by the two can be fused together. The scope of the present invention is not limited in this aspect.

Additionally, the electronic device 100 further comprises a battery 134, such as a vibrating battery pack, for supplying power to various circuits needed for operating the electronic device 100, and alternatively providing a mechanical vibration as a detectable output. The electronic device 100 further comprises a user identifier module (UIM) 138. The UIM 138 is usually a memory device having a built-in processor. The UIM 138 may for example comprise a subscriber identity module (SIM), a universal integrated circuit card (UICC), a universal subscriber identity module (USIM) or a removable user identity module (R-UIM), etc. The UIM 138 may comprise a card connection detection module according to embodiments of the present invention.

The electronic device 100 further comprises a memory device. For example, the electronic device 100 may comprise a volatile memory 140, for example, comprising a volatile random access memory (RAM) for temporarily storing data in a cache area. The electronic device 100 may also comprise other built-in or removable non-volatile memory 142. The non-volatile memory 142 may additionally or alternatively for example comprise an EEPROM and a flash memory, etc. The memory may store any item in a plurality of information segments and data used by the electronic device 100, so as to implement functions of the electronic device 100.

It should be understood that the structural block diagram in FIG. 1 is only for illustration purposes, not intended to limit the scope of the present invention. In some cases, some components may be added or omitted dependent on specific needs.

Figure 2:
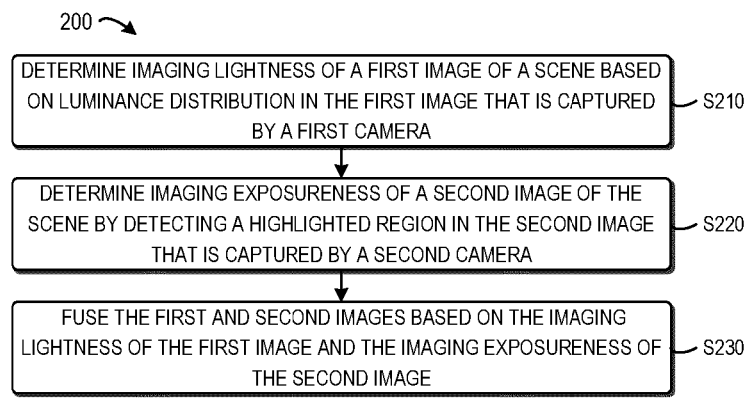
FIG. 2 shows a schematic flow diagram of a method for detecting an imaging condition according to an exemplary embodiment of the present invention.

FIG. 2 shows a schematic flow diagram of a method 200 for detecting an imaging condition according to embodiments of the present invention. The term "imaging condition" used here refers to factors that may affect image quality when capturing an image, including, but not limited to, ambient conditions, camera configurations, sensor characteristics, etc. In one embodiment, the imaging conditions may comprise lighting conditions. The lighting conditions may be measured by "lightness." According to embodiments of the present invention, the lightness may be qualitatively indicated, for example, "low lighting," "normal lighting," "bright lighting," and the like. Alternatively or additionally, the lightness may also be quantitatively expressed.

Additionally, the image conditions may also comprise exposure levels, the exposure levels may be measured by "exposureness." According to embodiments of the present invention, the exposureness for example may be qualitatively indicated, for example, "under exposure," "normal exposure," "over exposure," etc. Alternatively or additionally, the exposureness may be quantitatively expressed.

In the description below, the lightness and exposureness of imaging are described as examples of imaging parameters. However, it should be understood that they are only exemplary, not intended to limit the scope of the present invention in any manner. In addition to lightness and exposureness, any other appropriate imaging parameters may also be used to characterize imaging conditions. The scope of the present invention is not limited in this aspect.

In particular, as mentioned above, the exposure amount of the first camera 136 under the same lighting condition is smaller than that of the second camera 137. Therefore, generally, processing of the image (for example, color image) captured by the first camera 136 is mainly affected by the imaging lightness, while processing of the image (for example, block-white image) captured by the second camera is mainly affected by the imaging exposureness. Therefore, in one embodiment, detecting an imaging condition may be implemented as such: determining imaging lightness of the first camera 136, and determining imaging exposureness of the second camera 137. Again, this is only exemplary, not intended to limit the scope of the present invention in any manner.

As shown in FIG. 2, the method 200 starts from step S210, where the imaging lightness of a first image is determined based on luminance distribution in a first image of a given scene. According to embodiments of the present invention, the first image may be captured by a first camera (for example, a first camera 136 in the device 100). As mentioned above, under the same lighting condition, the exposure amount of the first camera 136 is very low. For example, the first camera 136 may be a color camera, and thus the first image may be a color image. Of course, this is not a must. Any camera with a low exposure amount may be used to capture the first image of the scene.

Figure 3:
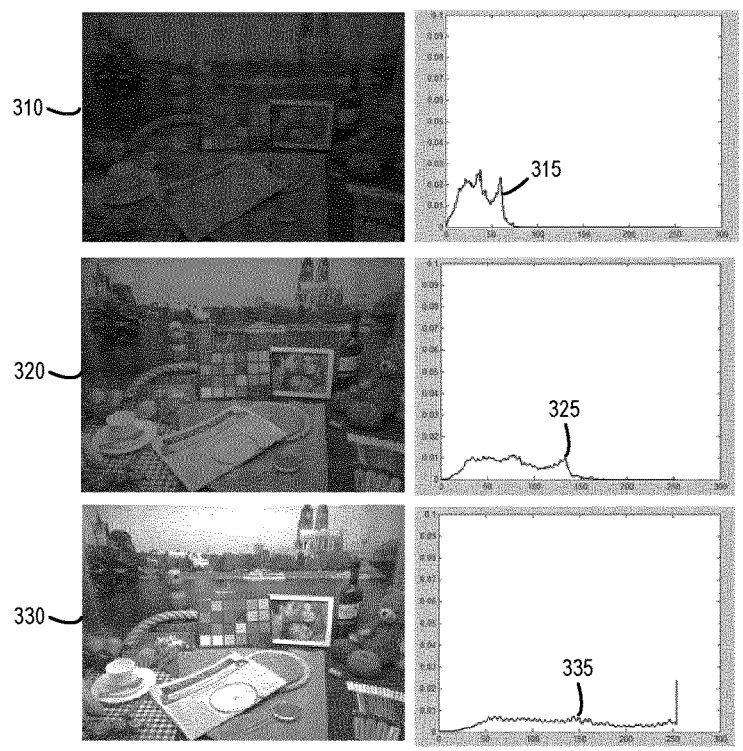
FIG. 3 shows a schematic diagram of images captured under different lightness and their luminance histograms according to exemplary embodiments of the present invention.

According to embodiments of the present invention, the lightness is determined based on a luminance distribution in the first image. Generally, different imaging lightness result in apparent different distribution rules for the lighting values of pixels in the image. As an example, FIG. 3 shows luminance histograms of images 310, 320, and 330. The term "luminance histogram" herein refers to a histogram of luminance component of an image, which may reflect a probability distribution condition of luminance in an image. In the example as shown in FIG. 3, the image 210 is captured in low lighting, the image 320 is captured in normal lighting, while the image 330 is captured in strong lighting.

It may be clearly seen from respective lighting histograms 315, 325, and 335 of images 310, 320, and 330 that different imaging lightness results in different luminance distributions of the images. Specifically, for the image 310 captured in a relatively low lightness, a great amount of pixels in the image has a relatively low luminance value; for the image 320 captured in a normal lightness, the luminance values of pixels in the image are distributed relatively evenly; for the image 330 captured in a relatively high lightness, a great amount of pixels in the image have a relatively high luminance value. According to embodiments of the present invention, such rule may be used for estimating the imaging lightness when capturing an image.

In one embodiment, the imaging lightness when the first image is captured may be estimated directly based on a luminance distribution of pixels of the first image. To this end, the luminance histogram of the first image may be directly used. Specifically, if the luminance values of the pixels exceeding a predetermined percentage or number in the first image are lower than a lower-limit threshold, it may be regarded that the first image is captured in low lighting; if the luminance value of pixels exceeding a predetermined percentage or number in the first image are higher than an upper-limit threshold, it may be believed that the first image is captured in bright lighting; in other cases, it may be believed that the first image is captured under normal lighting.

Alternatively, in one embodiment, a luminance accumulative distribution in the first image may be used so as to estimate the imaging lightness more accurately. The term "luminance accumulative distribution" used here refers to an accumulative probability distribution of luminance values of pixels in the first image. Specifically, for any given luminance value, the luminance accumulative distribution reflects a probability in which the luminance value of pixels in the first image is smaller than or equal to the luminance value. Intuitively, an accumulative histogram of luminance may be used to represent the luminance accumulative distribution.

Figure 4:
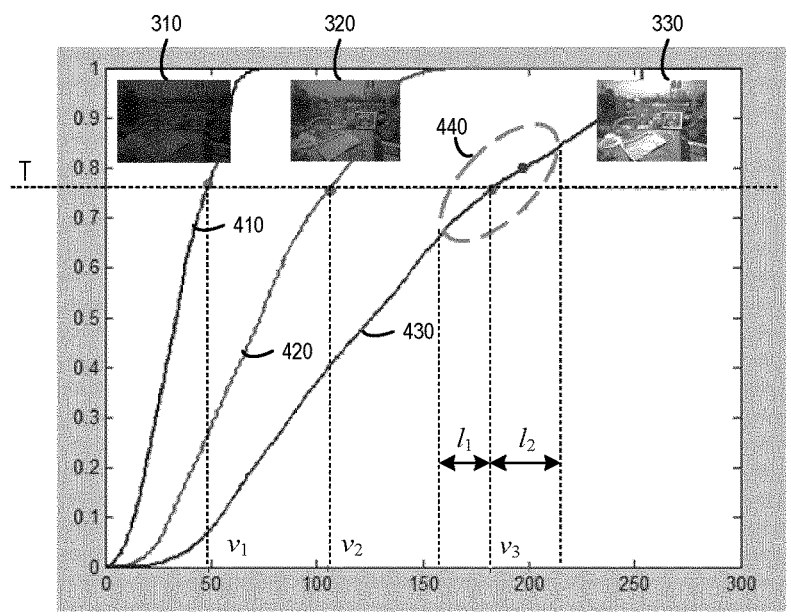
FIG. 4 shows a schematic diagram of an accumulative histogram representing luminance accumulative distribution according to exemplary embodiments of the present invention.

As an example, FIG. 4 shows curves 410, 420, 430 of the luminance accumulative histograms of three images 310, 320, and 330 in FIG. 3. In the coordinate system as shown in FIG. 4, the transversal axis represents a luminance value, ranging from 0~255; the longitudinal axis represents an accumulative distribution probability, ranging from 0~1. As shown in the figure, the speeds at which the luminance accumulative histograms of the images captured under different lighting conditions are converged to the probability "1" are significantly different. Therefore, the luminance accumulative distribution in the first image may be used as a reliable index for estimating the imaging lightness.

Specifically, in order to determine the luminance accumulative distribution of the first image, first, a number h(n) of the pixels in each luminance value n in the first image may be first calculated, wherein n is an integer between 0~255. Then, for each luminance value n, an accumulative number of pixels whose luminance values smaller than or equal to n in the first image may be calculated below:

$$c(n) = \sum_{i=0 \sim n} h(i)$$

Then the total number of pixels in the first image is used to normalize c(n), thereby obtaining the luminance accumulative distribution about the luminance value n.

Next, in one embodiment, a luminance range in which a predetermined percentage of pixels in the first image may be determined based on the obtained luminance accumulative distribution. The luminance range then may be used to estimate the imaging lightness when the first image is captured.

Still refer to FIG. 4. A predetermined pixel percentage T corresponds to a value ranging between 0 and 1, which represents a probability value of luminance accumulative distribution of pixels. Given this probability value, an associated pixel luminance value may be determined. Specifically, based on the normalized luminance accumulative distribution c(n), the luminance value v associated with T may be calculated as follows:

$$v = \arg\min(|c(n) - T|)$$

Only for the sake of illustration, suppose deriving v=70 when T=0.5. This means: in this example, 50% pixels in the image are distributed within this luminance range [0, 70]. At the ease of discussion, in the description below, the range of luminance will be represented by the upper-limit v of the luminance range.

According to embodiments of the present invention, for a given percentage value T, thresholds of luminance range v may be determined in advance for different lightness. With reference to FIG. 4, only for the purpose of illustration, suppose the predetermined percentage is set to T=0.76. In this case, what is determined is in which luminance range 76% pixels in the image are located. Additionally, suppose the lightness is divided into three levels, namely, "low lighting," "normal lighting," and "bright lighting."

With low lighting as an example, m images 310 captured in low lighting may be selected as training samples, wherein m is a natural number. During the training phase, the luminance range $v_{i,1}$ where pixels of a percentage T in each image 310 may be determined based on luminance accumulative distribution, wherein i is an integer ranging between 1~m. Based on this luminance range $v_{i,1}$, a luminance range $v_1$ of m images 310 captured in low lighting may be obtained. For example, in one embodiment, $v_1$ may be calculated as an average value of $v_{i,1}$. Alternatively, $v_1$ may also be calculated as a maximum value or a minimum value in $v_{i,1}$, and the like. The resulting luminance $v_1$ may be used as a threshold of the luminance range of low lighting.

In other words, during use, a luminance range v of pixels of a percentage T in the first image is determined. If v is less than or equal to $v_1$ or close enough to $v_1$, it may be believed that the first image is captured in low lighting. As an example, when T=76%, suppose it is found through training that in the image captured in low lighting, 76% pixels are located in the luminance range of [0, 50]. In this case, the threshold is set to $v_1$=50. In this case, if 76% of pixels in the first image are within the luminance range v≤$v_1$, it may be determined that the imaging lightness when the first image is captured is low lighting.

Similarly, for a given threshold T, thresholds $v_2$ and $v_3$ of the luminance range of the image captured under normal lighting and bright lighting may be obtained. By comparing the luminance range v of the first image with these predetermined thresholds, the imaging lightness when the first image is captured may be estimated.

In addition, it has been noticed that for some images, the luminance accumulative distribution has no apparent peak value. In this case, it might be inaccurate to estimate the actual lighting by directly using the calculated initial luminance range v. to this end, in one embodiment, after determining the initial luminance range v of a predetermined percentage of pixels in the first image, the luminance range may be adjusted.

Specifically, for the calculated initial luminance range v, one neighboring region [v−$l_1$, v+$l_2$] may be considered, wherein $l_1$ and $l_2$ are integers of a predetermined size. In some embodiments, it may be set $l_1$=$l_2$, which, however, is not a must. This neighboring region may be called a "luminance search region." In one embodiment, a variation ratio of the luminance accumulative distribution in the luminance search region may be calculated, and the luminance range v may be adjusted based on the variation ratio.

It should be understood that such luminance range adjustment may be applied to the training phase and/or actual detection of the lightness. For example, in the example as shown in FIG. 4, when calculating $v_1$, $v_2$, and/or $v_3$, this technology may be utilized to adjust the resulting initial luminance range. Likewise, for a first image captured by the first camera, the calculated initial luminance range v may be adjusted in the lightness estimation.

As an example, FIG. 4 shows an example of adjusting $v_3$ associated with bright lighting based on a variation ratio of the luminance accumulative distribution. As shown in the figure, the luminance search region [$v_3$−$l_1$, $v_3$+$l_2$] corresponds to the area 440 on the accumulative curve. For each luminance value $v_i$ in the luminance search region [$v_3$−$l_1$, $v_3$+$l_2$], a point corresponding to $v_i$ on the accumulative curve may be determined, and a gradient of the accumulative curve at this point may be calculated. As known, the gradient represents a changing ratio of the luminance accumulative distribution when the luminance value is $v_i$. In one embodiment, a luminance value $v_i$* corresponding to the largest variation ratio may be selected, and the luminance range $v_3$ is adjusted to $v_i$*.

It should be understood that the above example described with reference to FIG. 4 is only for the purpose of illustration, not intended to limit the scope of the present invention in any manner. For example, the lightness is not limited to the three levels "low lighting," "normal lighting" and "bright lighting." Instead, it may be divided into any desired levels.

Continue reference to FIG. 2, the method 200 proceeds to step S220, where a highlighted region is detected in a second image of the scene, thereby determining the imaging exposureness of the second image. According to embodiments of the present invention, the second image is captured by a second camera 137 different from the first camera 136. In particular, under the same luminance, the exposure amount of the second camera 137 is apparently greater than the exposure amount of the first camera 136. For example, as mentioned above, the second camera 137 may be a block-white camera, whose exposure amount may reach 3~4 times of the color camera. Accordingly, the second image may be a black-white image.

According to embodiments of the present invention, the scenes included in the first image and the second image are identical; besides, the two are captured under the same or similar imaging conditions. For example, in one embodiment, the second camera 137 may capture the second image while the first camera is capturing the first image. The term "simultaneously" used here refers to the gap between the times of capturing the first image and the second image is less than a predetermined threshold. Of course, it is not a must. The first image and the second image may also be captured in sequence at different times, as long as it is guaranteed that the scenes and imaging conditions of the two are identical or similar enough.

Because the exposure amount of the second camera 137 is relatively high, a reasonable hypothesis is that: the underexposure circumstance will not occur when the second camera 137 captures the second image. Therefore, how to detect over exposure will be focused in the description infra. In the case of non-existence of over exposure, the exposureness is identified as normal exposure. Of course, this is only exemplary. In other embodiments, the under exposure circumstances may also be likewise considered and detected.

Generally, when the second image is captured in the case of over exposure, the second image will include one or more highlighted regions. A highlighted region refers to a connected region whose luminance exceeds a predetermined threshold luminance. In view of this phenomenon, according to embodiments of the present invention, the imaging exposureness may be determined by detecting a highlighted region in the second image.

To this end, in one embodiment, an appropriate luminance threshold may be first selected. The threshold may be set by the user or obtained by experiment or experience. For example, in one embodiment, the luminance threshold may be close to 255, for example, a value greater than 250. Then, the second image is binarized based on the luminance threshold. In other words, the color of the pixels whose luminance value is greater than the threshold is set to be white, while the color of the pixels whose luminance value is less than or equal to the threshold is set to be black. Alternatively, the second image may be subjected to a morphological operation so as to obtain a relatively connected region. In this way, a binary mask may be obtained.

In a binary mask, each connected white region may be identified as a highlighted region. In one embodiment, if a number of such highlighted regions is greater than a predetermined threshold, it may be believed that the second image is captured in over exposure. Therefore, the imaging exposureness may be determined as "normal exposure." Alternatively or additionally, in one embodiment, the exposureness may also be estimated based on the area of the highlighted region.

However, it should be understood that when there is a white object r other object having a bright color in the scene, such a connected white region will likewise exist in the binary mask. In this case, if the imaging exposureness is estimated only based on the number and/or area of highlighted regions, misdetection likely occurs. In order to further enhance the accuracy of exposureness estimation, in one embodiment, texture information included in a region, in the first image, corresponding to the highlighted region may be taken into consideration.

It would be appreciated that the texture included in the highlighted area in the second image is usually very rare. Meanwhile, because the exposure amount of the first camera is relatively low, the possibility of the first image being captured in over exposure is very small. Therefore, if a specific area in a scene is identified as a highlighted region in the second image, while the first image has relatively rich texture, then such texture loss is very likely caused by over exposure of the second image.

Figure 5:
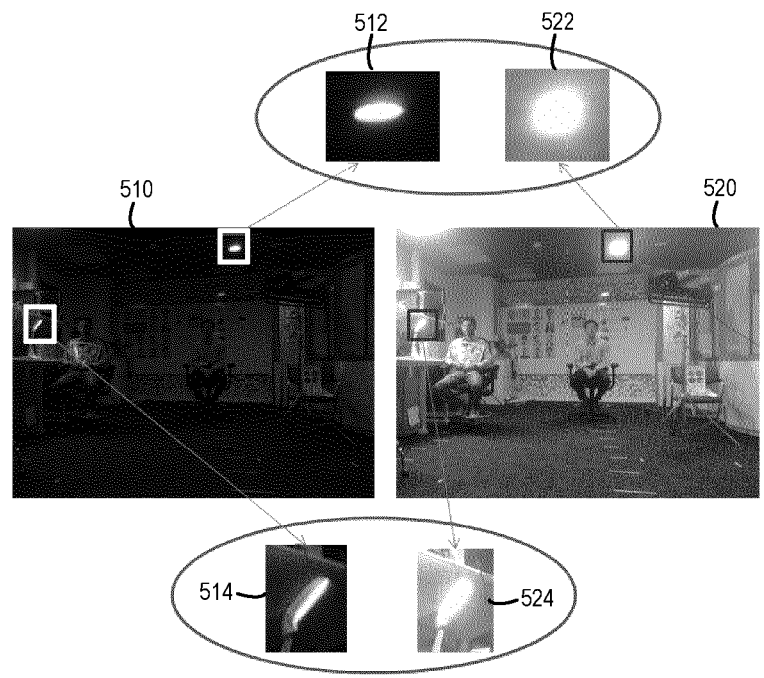
FIG. 5 shows a schematic diagram of texture of a highlighted region caused by over exposure according to exemplary embodiments of the present invention.

As an example, as shown in FIG. 5, an image 510 is captured by a first camera, and an image 520 is captured by a second camera. A region 512 in the first image 510 corresponds to a highlighted region in the second image 520. It may be seen that the texture included in the region 512 is apparently more than that in the highlighted region 522. Likewise, the texture in the region 514 in the first image 510 is more than a corresponding highlighted region 524 in the second image 520. With this phenomenon, the texture information included in a region, in the first image, corresponding to the highlighted region in the second image may be used to enhance the accuracy of exposureness estimation of the second camera.

Specifically, in such an embodiment, for each highlighted region detected in the second image, a corresponding region may be found in the first image. Then, texture within the corresponding region may be obtained. As known, texture is usually a high-frequency component in the image. Therefore, in one embodiment, edge extraction may be applied to a corresponding region in the first image so as to extract the edge in the region. Any currently known or future developed edge extracting method may be used in conjunction with embodiments of the present invention. For example, an edge operator may be applied to extract the edge. Examples of the edge operator include, but not limited to, one or more of the following: Sobel operator, Roberts operator, Canny operator, etc. It should be understood that obtaining texture information through edge extraction is only exemplary, not intended to limit the scope of the present invention in any manner. In addition to or in lieu of edge extraction, wavelet transformation, local binary patterns (LBP) and various other methods may be used to extract texture in the image region.

Then, a texture amount in a corresponding region of the first image may be determined. For example, in one embodiment, a number and/or length of the edges as extracted may be calculated to be used as texture amount in the region. If the texture amount included in the region, in the first image, corresponding to the highlighted region is greater than a predetermined threshold, it indicates that the texture in the region is seriously damaged in the second image, while such loss is caused by over exposure.

In one embodiment, texture amounts included in regions, in the first image, corresponding to all highlighted regions detected in the second image are accumulated. Suppose the highlighted regions detected in the second image are i=1, 2 . . . m. For each highlighted region $r_i$, texture amount included in the region corresponding thereto in the first image is denoted as $M_{i,1}$. The total texture amount included in all regions corresponding to the highlighted regions in the first image is:

$$E = \sum_{i=1 \sim m} M_{i,1}$$

In this way, the imaging exposureness may be determined by comparing the total texture amount E and a predetermined threshold. If the total texture amount E exceeds the predetermined threshold, it is believed that the second image is captured in over exposure. On the contrary, if the total texture amount E is lower than the predetermined threshold, it may be believed that the second image is captured in normal exposure.

The example described above only considers the total texture amount E included in the regions, in the first image, corresponding to the highlighted regions. Alternatively, in one embodiment, a texture amount of a highlighted region in the second image may also be considered. Specifically, for each highlighted region $r_i$, a texture amount $M_{i,2}$ of the highlighted region in the second image may be calculated. Therefore, for a highlighted region $r_i$, a difference $M_{i,1} - M_{i,2}$ of texture amounts between the first image and the second image may be determined. Then, differences of texture amounts may be accumulated as follows:

$$E' = \sum_{i=1 \sim m} (M_{i,1} - M_{i,2})$$

Accordingly, the imaging exposureness may be determined by comparing E' and a predetermined threshold.

It should be understood that use of measurement E' is optional. Actually, when the second image is captured in over exposure, the textures included in the highlighted regions in the second image are very few, even not existent at all. Therefore, $M_{i,2}$ may always be omitted. In other words, the imaging exposure may be determined by only using the measurement E as described above.

After the imaging condition is determined using the images captured by two cameras, various processing may be performed to the captured picture based on the imaging condition. For example, in one embodiment, the method 200 may proceed to step S230, where based on the imaging lightness determined in step S210 and the imaging exposureness determined in step S220, the first image and the second image are fused.

As mentioned above, the first camera 136 and the second camera 137 may be two cameras in the dual-camera configuration. For example, the first camera 136 may be a color camera, while the second camera 137 is a black-white camera. In this case, the two cameras may be configured to simultaneously capture the image in a scene. The captured image may finally form a complete resulting image through fusion. In this way, advantages of the first camera 136 and the second camera 137 may be simultaneously leveraged to obtain a resulting image with a better quality and effect.

As known, given two images (for example, one is a black-white image, the other is a color image), fusion is substantially divided into three phases. The first phase is pre-processing, for example, including processing such as image alignment, low lighting removal. The second phase is fusion processing, for example, including processing such as HDR, super-resolution, color fusion, etc. The third phase is post-processing, for example, including processing such as noise filtering, color enhancement, etc. Among the above processing, some processing is essential. For example, image alignment has always to be executed so as to align the images captured by two cameras.

However, some other processing is optional. During the image fusing process, whether such optional processing is executed or not may be dependent on the imaging condition. For example, for fusion of the black-white image and the color image, processing of the color image is mainly affected by the lightness, while the processing of the black-white image is mainly affected by exposureness. As an example, when the color image is captured in normal lighting or bright lighting, the super-resolution technology may be applied. As known, the super-resolution technology may implement super-resolution reestablishment based on an image of a low resolution, thereby obtaining a resultant image having a high resolution. However, when the color image is captured in low lighting, it would be unnecessary to apply super-resolution processing.

Therefore, in one embodiment, one or more processing in image fusion may be adaptively enabled or disabled based on an automatically determined imaging condition. As an example, such processing includes, but not limited to, one or more of the following: low-lighting removal processing, high dynamic range processing, super-resolution processing, noise filtering processing, and color enhancement processing. It should be noted that such processing per se is already known in the art, and any currently known or future developed technologies may be used. In order to avoid confusing the subject matter of the present invention, implementation details of such processing will not be detailed here.

As an example, in an embodiment where the first camera 136 is a color camera and the second camera 137 is a black-white camera, it may be supposed that the black-white camera 137 having a larger exposure amount will not be under exposed. Therefore, the following six exposure conditions may be defined based on the imaging lightness of the color image and the imaging exposureness of the black-white image:

1) low lighting+normal exposure
2) normal lighting+normal exposure
3) bright lighting+normal exposure
4) low lighting+over exposure
5) normal lighting+over exposure
6) bright lighting+over exposure Accordingly, for each imaging condition, various processing that needs to be enabled or disabled during the fusion processing may be preset. For example, in one embodiment, various optional processing may be configured as follows:

|  | Black-White Image | Normal Exposure | | | Over Exposure | | |
|---|---|---|---|---|---|---|---|
| Imaging Condition | Color Image | Low lighting | normal lighting | strong lighting | Low lighting | normal lighting | strong lighting |
| Noise Filtering |  | enabled | enabled | disabled | enabled | enabled | disabled |
| Low-Lighting Filtering |  | enabled | disabled | disabled | enabled | disabled | disabled |
| HDR |  | disabled | disabled | disabled | enabled | enabled | enabled |
| Color Enhancement |  | enabled | enabled | disabled | enabled | enabled | disabled |
| Super-Resolution |  | disabled | enabled | enabled | disabled | enabled | enabled |

The above table may be stored in advance. Alternatively or additionally, image processing that image processing that needs to be performed under different lighting conditions may be indicated by a command word. In use, based on the imaging lightness of the first image determined in step S210 and the imaging exposureness of the second image determined in step S220, which optional processing may be determined to be enabled by referring to the above table and/or command word.

Figure 6:
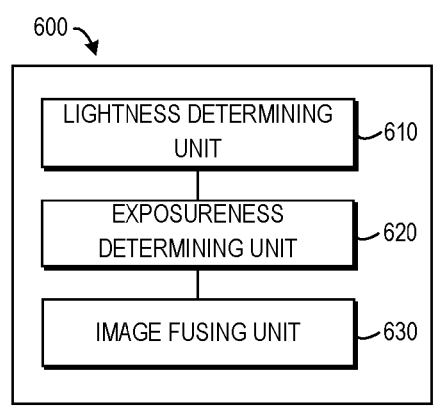
FIG. 6 shows a schematic block diagram of an apparatus for detecting an imaging condition according to exemplary embodiments of the present invention.

FIG. 6 illustrates a schematic block diagram of an apparatus 600 for detecting an imaging condition according to embodiments of the present invention. As shown in the figure, the apparatus 600 comprises: a lightness determining unit 610 configured to determine, based on luminance distribution in a first image of a scene, imaging lightness of the first image, the first image being captured by a first camera; an exposureness determining unit 620 configured to determine, based on detection of a highlighted region in a second image of the scene, imaging exposureness of the second image, the second image being captured by a second camera. According to embodiments of the present invention, the first image and the second image are captured under a same or similar imaging condition, and an exposure amount of the first camera is lower than an exposure amount of the second camera.

In one embodiment, the apparatus 600 may further comprise: an accumulative distribution determining unit configured to determine luminance accumulative distribution in the first image; and a luminance range determining unit configured to determine, based on the luminance accumulative distribution, a luminance range of pixels of a predetermined percentage in the first image. In such an embodiment, the lightness determining unit 610 may be configured to determine the imaging lightness based on the luminance range.

In one embodiment, the apparatus 600 may further comprise: a variation ratio calculating unit configured to calculate a variation ratio of the luminance accumulative distribution in a luminance search region; and a luminance range adjusting unit configured to adjust the luminance range based on the variation ratio for determining the imaging lightness.

In one embodiment, the exposureness determining unit 620 may comprise: a detecting unit configured to detect the highlighted region by binarizing the second image using a predetermined luminance threshold.

In one embodiment, the exposureness determining unit 620 may comprise: a texture obtaining unit configured to, in response to detecting the highlighted region in the second image, obtain texture in a region, in the first image, corresponding to the highlighted region; and a first exposureness determining unit configured to determine the imaging exposureness based on an amount of the texture. In one embodiment, the texture obtaining unit may comprise: an edge extracting unit configured to extract edges in the region of the first image as the texture.

In one embodiment, the apparatus 600 may further comprise an image fusing unit 630 configured to fuse the first image and the second image based on the imaging lightness of the first image and the imaging exposureness of the second image. In one embodiment, the image fusing unit 630 may comprise: an adaptive controlling unit configured to, based on the imaging lightness of the first image and the imaging exposureness of the second image, enable or disable at least one of the following processing during the fusion: low-lighting removal processing, high dynamic range processing, super-resolution processing, noise filtering processing, and color enhancement processing.

Note that for the sake of clarity, FIG. 6 does not show optional units or sub-units included in the apparatus 600. However, it should be understood that various features as described above with reference to FIGS. 1-4 are likewise applicable to the apparatus 600, which are therefore not detailed here. Moreover, the term "unit" used here may not only be a hardware module or a software unit module. Correspondingly, the apparatus 600 may be implemented in various manners. For example, in some embodiments, the apparatus 600 may be partially or entirely implemented by software and/or firmware, for example, implemented as a computer program product embodied on a compute readable medium. Alternatively or additionally, the apparatus 600 may be implemented partially or completely based on hardware, for example, implemented as an integrated circuit (IC) chip, an application-specific integrated circuit (ASIC), a system on chip (SOC), a field programmable gate array (FPGA), etc. The scope of the present intention is not limited to this aspect.

Only for the illustration purpose, several exemplary embodiments of the present invention have been described above. Embodiments of the present invention may be implemented by hardware, software or a combination of the software and combination. The hardware part may be implemented using a dedicated logic; the software part may be stored in the memory, executed by an appropriate instruction executing system, for example, a microprocessor or a dedicatedly designed hardware. Specifically, the above method described with reference to FIG. 2 may be implemented as a computer program product. The computer program product is tangibly stored on a non-transient computer readable medium and includes machine-executable instruction, which, when executed, enables the machine to perform steps of the method 200.

A person of normal skill in the art may understand that the above apparatus and method may be implemented using a computer-executable instruction and/or included in processor control code. In implementation, such code is provided on a medium such as magnetic disk, CD or DVD_ROM, a programmable memory such as read-only memory (firmware), or a data carrier such as optical or electronic signal carrier. The system of the present invention can be implemented by a very large scale integrated circuit or gate array, semiconductor such as logic chips and transistors, or hardware circuitry of programmable hardware devices like field programmable gate arrays and programmable logic devices, or implemented by various kinds of processor-executable software, or implemented by a combination of the above hardware circuits and software, such as firmware.

Note although several units or sub-units of the apparatus have been mentioned in the above detailed description, such division is merely exemplary and not mandatory. In fact, according to embodiments of the present invention, the features and functions of two or more modules described above may be embodied in one module. On the contrary, the features and functions of one module described above may be embodied by a plurality of modules. In addition, although in the accompanying drawings operations of the method of the present invention are described in specific order, it is not required or suggested these operations be necessarily executed in the specific order or the desired result should be achieved by executing all illustrated operations. On the contrary, the steps depicted in the flowcharts may change their execution order. Additionally or alternatively, some steps may be omitted, a plurality of steps may be combined into one step for execution, and/or one step may be decomposed into a plurality of steps for execution.

Although the present invention has been described with reference to several embodiments, it is to be understood the present invention is not limited to the embodiments disclosed herein. The present invention is intended to embrace various modifications and equivalent arrangements comprised in the spirit and scope of the appended claims. The scope of the appended claims accords with the broadest interpretation, thereby embracing all such modifications and equivalent structures and functions.

What is claimed is:
1. A method of detecting an imaging condition, the method comprising:
determining, based on luminance distribution in a first image of a scene, imaging lightness of the first image, the first image being captured by a first camera; and determining, based on a detection of a highlighted region in a second image of the scene, imaging exposureness of the second image, the second image being captured by a second camera, wherein the first image and the second image are captured under a same or similar imaging condition, and an exposure amount of the first camera is lower than an exposure amount of the second camera.

2. The method of claim 1, wherein determining imaging lightness of the first image comprises:

determining luminance accumulative distribution in the first image;

determining, based on the luminance accumulative distribution, a luminance range of pixels of a predetermined percentage in the first image; and determining the imaging lightness based on the luminance range.

3. The method of claim 2, wherein determining the imaging lightness based on the luminance range comprises:

calculating a variation ratio of the luminance accumulative distribution in a luminance search region; and adjusting the luminance range based on the variation ratio for determining the imaging lightness.

4. The method of claim 1, wherein determining an imaging exposureness of the second image comprises:

in response to detecting the highlighted region in the second image, obtaining texture in a region in the first image corresponding to the highlighted region; and determining the imaging exposureness based on an amount of the texture.

5. The method of claim 4, wherein obtaining texture in a region in the first image corresponding to the highlighted region comprises:

extracting edges in the region of the first image as the texture.

6. The method of claim 1, further comprising:

fusing the first image and the second image based on the imaging lightness of the first image and the imaging exposureness of the second image.

7. The method of claim 6, wherein fusing the first image and the second image comprises:

enabling or disabling at least one of the following processing during the fusion based on the imaging lightness of the first image and the imaging exposureness of the second image: low-lighting removal processing, high dynamic range processing, super-resolution processing, noise filtering processing, and color enhancement processing.

8. The method of claim 1, wherein determining imaging exposureness of the second image comprises:

detecting the highlighted region by binarizing the second image using a predetermined luminance threshold.

9. The method of claim 1, wherein the first camera is a color camera, and wherein the second camera is a black-white camera.

10. An apparatus for detecting an imaging condition, the apparatus comprising:

a lightness determining unit configured to determine, based on luminance distribution in a first image of a scene, imaging lightness of the first image, the first image being captured by a first camera;

an exposureness determining unit configured to determine, based on a detection of a highlighted region in a second image of the scene, imaging exposureness of the second image, the second image being captured by a second camera, wherein the first image and the second image are captured under a same or similar imaging condition, and an exposure amount of the first camera is lower than an exposure amount of the second camera.

11. The apparatus of claim 10, further comprising:

an accumulative distribution determining unit configured to determine luminance accumulative distribution in the first image; and a luminance range determining unit configured to determine, based on the luminance accumulative distribution, a luminance range of pixels of a predetermined percentage in the first image, wherein the lightness determining unit is configured to determine the imaging lightness based on the luminance range.

12. The apparatus of claim 11, further comprising:

a variation ratio calculating unit configured to calculate a variation ratio of the luminance accumulative distribution in a luminance search region; and a luminance range adjusting unit configured to adjust the luminance range based on the variation ratio for determining the imaging lightness.

13. The apparatus of claim 10, further comprising:

an image fusing unit configured to fuse the first image and the second image based on the imaging lightness of the first image and the imaging exposureness of the second image.

14. The apparatus of claim 13, wherein the image fusing unit comprising:

an adaptive controlling unit configured to enable or disable at least one of the following processing during the fusion based on the imaging lightness of the first image and the imaging exposureness of the second image: low-lighting removal processing, high dynamic range processing, super-resolution processing, noise filtering processing, and color enhancement processing.

15. The apparatus of claim 10, wherein the exposureness determining unit comprise:

a detecting unit configured to detect the highlighted region by binarizing the second image using a predetermined luminance threshold.

16. The apparatus of claim 10, wherein the exposureness determining unit comprises:

a texture obtaining unit configured to obtain texture in a region in the first image corresponding to the highlighted region in response to detecting the highlighted region in the second image; and a first exposureness determining unit configured to determine the imaging exposureness based on an amount of the texture.

17. The apparatus of claim 10, further comprising:

an edge extracting unit configured to extract edges in the region of the first image as the texture.

18. The apparatus of claim 10, wherein the first camera is a color camera, and wherein the second camera is a black-white camera.

19. A computer program product for detecting an imaging condition, the computer program product is tangibly stored on a non-transitory computer readable medium and includes machine-executable instruction, which, when executed, enables the machine to: determine, based on luminance distribution in a first image of a scene, imaging lightness of the first image, the first image being captured by a first camera; and determine, based on a detection of a highlighted region in a second image of the scene, imaging exposureness of the second image, the second image being captured by a second camera, wherein the first image and the second image are captured under a same or similar imaging condition, and an exposure amount of the first camera is lower than an exposure amount of the second camera.

* * * * *